H. C. FENTRESS.
AUTOMATIC TAKE-OFF DEVICE FOR GLASS BLOWING MACHINES.
APPLICATION FILED FEB. 21, 1919.
1,336,028.
Patented Apr. 6, 1920.
2 SHEETS—SHEET 1.
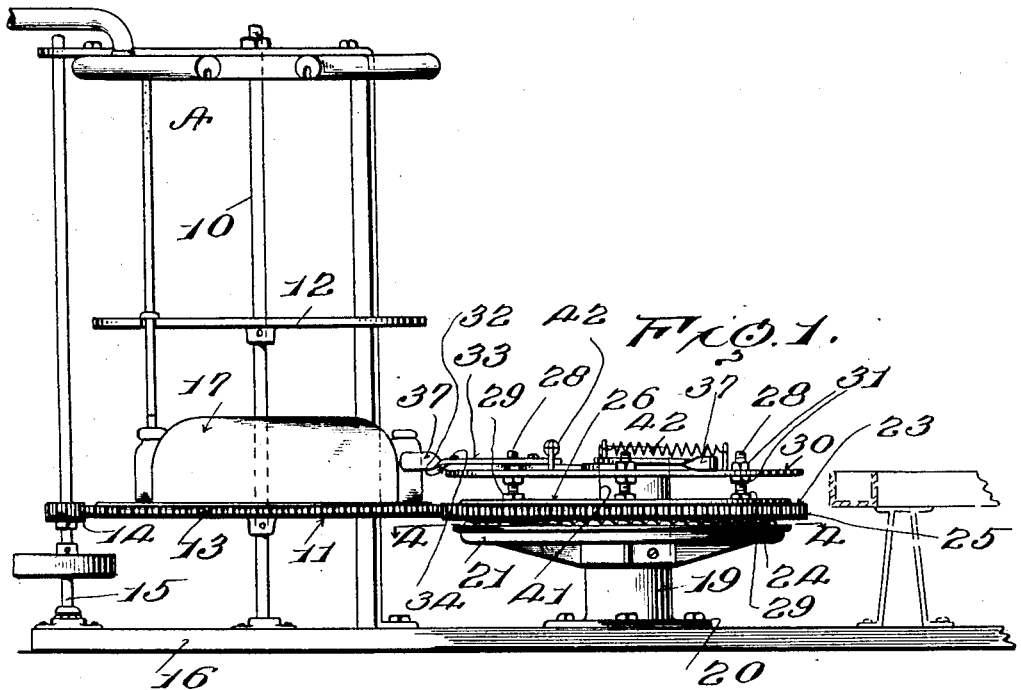
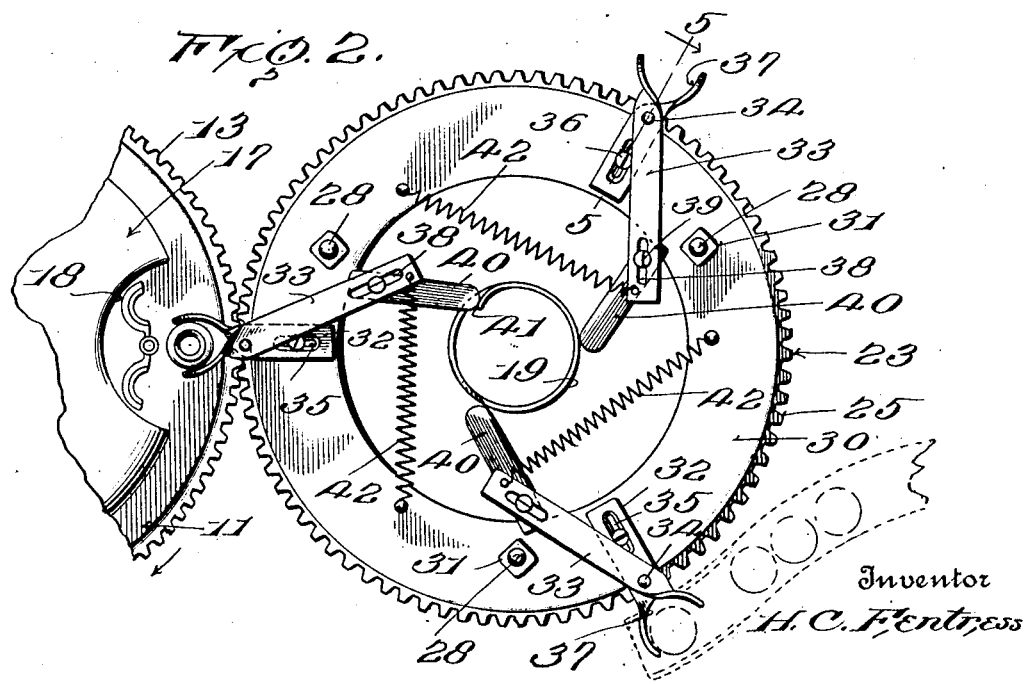
Inventor
H. C. Fentress
By
Attorneys.

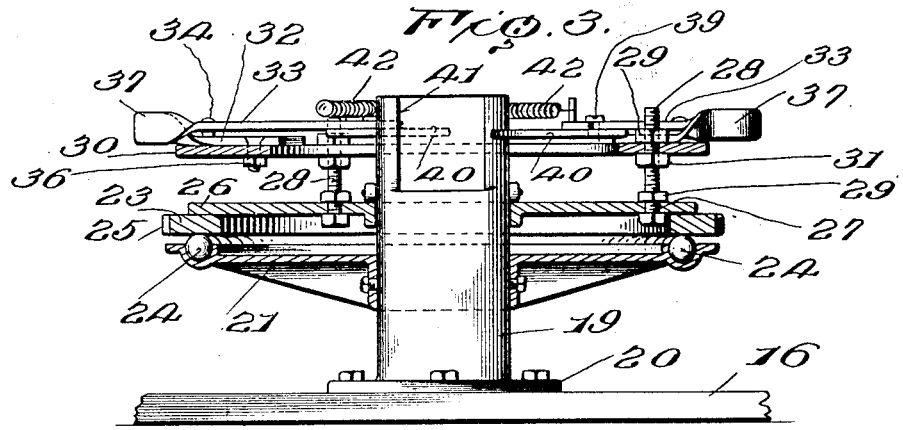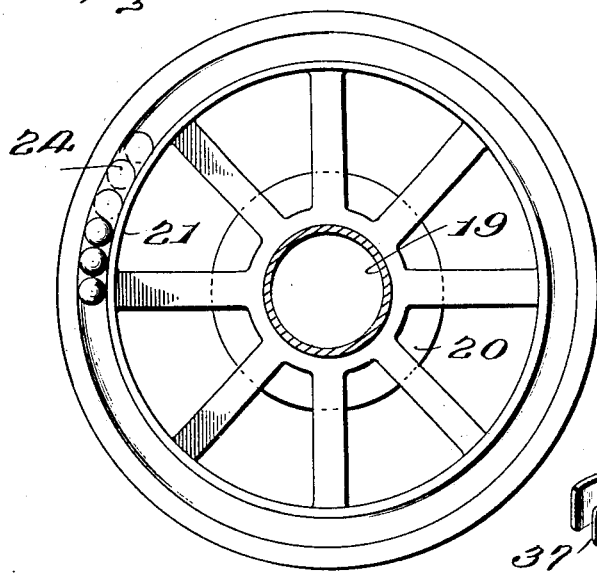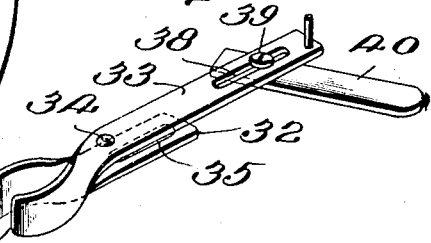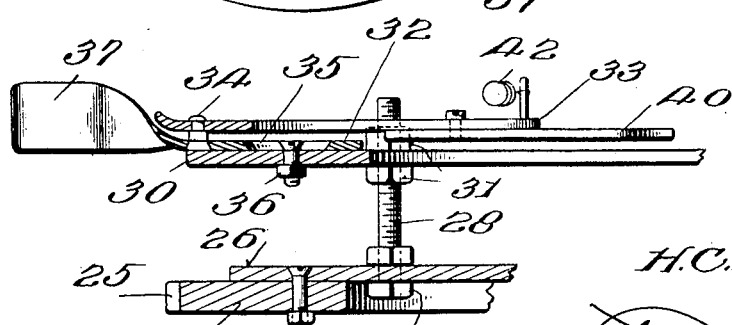

UNITED STATES PATENT OFFICE.

HENRY C. FENTRESS, OF GLEN DEAN, KENTUCKY.

AUTOMATIC TAKE-OFF DEVICE FOR GLASS-BLOWING MACHINES.

1,336,028.   Specification of Letters Patent.   Patented Apr. 6, 1920.

Application filed February 21, 1919. Serial No. 278,492.

*To all whom it may concern:*

Be it known that I, HENRY C. FENTRESS, a citizen of the United States, residing at Glen Dean, in the county of Breckinridge, State of Kentucky, have invented certain new and useful Improvements in Automatic Taking-Off Devices for Glass-Blowing Machines; and I do hereby declare the following to be a full, clear, and exact description of the invention, such as will enable others skilled in the art to which it appertains to make and use the same.

The invention relates to an automatic glass blower attachment, and more particularly to the class of devices for removing or transferring glass blown articles particularly bottles from the glass blowing apparatus.

The primary object of the invention is, the provision of a device of this character, wherein on the operation of the glass blowing apparatus the said device will be automatically operated for the successful removal of glass blown articles from the apparatus during its operation, thereby eliminating the manual removal of the articles and the handling thereof, in the ordinary well known manner, the articles being removed from the glass blowing apparatus and deposited on to a table or receiver therefor.

Another object of the invention is, the provision of a device of this character, wherein the construction thereof is novel in form so that the glass blown articles will be taken up from the glass blowing apparatus and automatically handled singly in successive order for the removal of the articles from the apparatus.

A further object of the invention is, the provision of a device of this character wherein the grab arms for the glass blown articles are mounted upon a carrier, which when rotating will automatically bring the catching arms into the proper position for the successful removal of the articles from the glass blowing apparatus, and these articles will be carried by the arms and subsequently deposited at a predetermined point into a receiver or other depository, the arms being automatically operated and controlled, as well as properly timed for the successful working thereof to assure the single delivery of the articles from the glass blowing machine or apparatus in successive order during the working of said machine or apparatus thereby eliminating manual handling of the glass blown articles.

A still further object of the invention is, the provision of a device of this character, which is comparatively simple in construction, thoroughly reliable and efficient in its operation, automatic in action and inexpensive to manufacture and install.

With these and other objects in view, the invention consists in the features of construction, combination and arrangement of parts as will be hereinafter fully described, illustrated in the accompanying drawing and pointed out in the claims hereunto appended.

In the accompanying drawing—

Figure 1, is a fragmentary elevation of portion of a glass blowing apparatus showing the device constructed in accordance with the invention, connected therewith and coöperating with the same.

Fig. 2, is a top plan view of the device.

Fig. 3, is a vertical longitudinal sectional view.

Fig. 4, is a horizontal sectional view on the line 4—4 of Fig. 1.

Fig. 5, is a view on the line 5—5 of Fig. 2, looking in the direction of the arrow.

Fig. 6, is a detailed perspective view of one pair of removing arms or jaws of the device.

Similar reference characters indicate corresponding parts throughout the several views in the drawing.

Referring to the drawing in detail, A designates generally a portion of an automatic glass blowing machine or apparatus of any well known type, the same being provided with the usual vertical shaft 10 on which is rotatably supported a turn-table 11, while above the same is the armed spider 12 having suitable catch devices which yieldably retain the blow pipes in vertical position during the rotation of the circular table 11, the latter being formed at its periphery with gear teeth 13 with which meshes a pinion 14 upon a driving shaft 15, journaled vertically in the base 16 of the machine, as is the shaft 10. Said table revolves clockwise and has supported thereon a crown 17 provided at intervals with depressions 18 opening through the periphery thereof to accommodate the glass articles blown by the blow pipes carried by the spider in the automatic operation of the blowing machine or apparatus.

The blowing machine or apparatus forms no part of the present invention and that portion shown in the accompanying drawing and hereinbefore described is merely illustrated to disclose the automatic taking off device forming the subject matter of the present invention hereinafter fully described.

The automatic taking off device comprises a pedestal or tubular post 19 having the base 20 thereof fixed to a foundation or flooring at one side of the base 16 of the automatic blowing machine or apparatus, and upon this pedestal or post is mounted a horizontally disposed wheeled-like or annular bearing 21 the rim of which is concentric to the pedestal or post 19, while journaled upon said post or pedestal for rotation thereon is a turn-table 23, having interposed between the latter and said rim antifriction bearings or balls 24. Said table has peripheral gear teeth 25 meshing with the gear teeth 13 of the rotatable bed or table 11 of the glass blowing machine or apparatus, so that when the latter is operated the turn-table 23 will be rotated thereby. Carried by the turn-table 23, above the same concentrically of the pedestal or post 19, is a ring 26 having formed therein at intervals circumferentially of the same, suitable openings or holes 27, in which are engaged vertical screw tipped studs 28 which are held fast in the holes 27 through the medium of binding nuts 29 threaded upon the studs.

Mounted upon the studs 28 for vertical adjustment is an annulus 30, which is held in adjusted position on the studs by means of binding nuts 31 working against opposite faces of the annulus and adjustably threaded on the studs so that the annulus can be raised and lowered relative to the ring 26 on the turn-table.

Carried upon the annulus 30 are automatically operated take off jaws each comprising a pair of levers 32 and 33 respectively, the lever 32 constituting the stationary jaw member, while the lever 33 constitutes the movable jaw member, and these levers are connected together in crossed relation to each other through the medium of a pivot 34 so that the movable jaw member will open and close relative to the stationary jaw member, the latter 32 being formed with an elongated slot 35 longitudinally therein, and in this slot is engaged a set screw 36 which is also engaged in the annulus 30 and in this manner the lever 32 can be angularly adjusted and extended and retracted on the annulus, for the proper setting of the same relative to the automatic blowing machine or apparatus. The levers 32 and 33 at their outer ends are formed with catching jaws 37 for engaging the glass blown articles in the depressions 18 in the crown 17 on the table 11 of the glass blowing machine or apparatus for the transferring of the glass blown articles therefrom on to the receiver or other depository.

The lever 33 is formed with an elongated slot 38 longitudinally therein for receiving a set screw 39 which adjustably connects to the said lever 33, a tripping tail-piece 40 which is projected into the path of and adapted to be acted upon by a tripping cam 41 cut and formed from the upper end of the post or pedestal 19, while connected to the lever 33 is a coiled retractile spring 42 which is also connected to the ring 26, the spring being designed to tension the lever 32 for automatically moving the jaw 37 thereof, closed, relative to the jaw 37 of the lever 32 and also to maintain the tripping piece 40 in working position relative to the cam 41 to be acted upon thereby, in the working of the automatic taking off device for the removal of the glass blown articles from the glass blowing machine or apparatus and transferring the same to a receiver or other depository.

The turn-table 23 operates simultaneously with the table 11 and the taking off jaws are set at intervals circumferentially upon the annulus 30 so that the said jaws will enter the depressions 18 in the crown 17 and the levers 33 of each pair of jaws will be automatically opened by the action of the tripping piece 40 of the tripping cam 41 for receiving the glass blown articles in single order from the glass blowing machine or apparatus at the point of the depression 18 in the crown 17, and transferring the same on to a receiver or depository during the rotation of the turn-table 11 in the actuation of the automatic taking off device, thereby dispensing with manual labor for the handling of the glass blown articles for the removal and deposit thereof from the glass blowing machine or apparatus, in the operation of the same.

The annulus 30 can be raised and lowered to position the jaws thereon at the proper height so that the same will automatically take off glass blown articles of various heights and through the tripping piece 40 can be adjusted on the lever 33 for regulating the movement of the opening and closing of one jaw relative to the other of each pair for the successful working of the take off device. Furthermore, the lever 32 can be adjusted on the annulus 30 for properly projecting the jaws or positioning the same inwardly for the successful working of the jaws in the operation of the automatic take off device.

When the turn-table 23 rotates the trip piece 40 will be successively operated upon by the cam 41 which automatically controls the jaws 37 for opening and closing movement to take up the glass blown articles from the glass blowing machine or apparatus and remove or transfer the same therefrom and subsequently deliver them successively in single order to a receiver or depository, the automatic taking off device being operated synchronously with the automatic blowing machine or apparatus.

It is of course to be understood that changes and variations may be made such as come properly within the scope of the appended claims without departing from the spirit of the invention or sacrificing any of its advantages.

What is claimed is:

1. The combination with a glass blowing machine having a movable glass blown article support, of an automatic taking off device comprising a pedestal, a turn table rotatably supported thereon, an annulus vertically adjustable on the turn table, a plurality of pairs of pivotally connected jaws carried by the annulus for engaging and removing glass blown articles from the support, a tail piece on one jaw of each pair, and a cam on the pedestal engaged by said tail piece and controlling the jaws for the automatic working thereof.

2. The combination with a glass blowing machine having a movable glass blown article support, of an automatic taking off device comprising a pedestal arranged at one side of the support, a stationary bed on the pedestal, a turn-table movable upon the bed, an annulus vertically adjustable on the turn-table, a plurality of pairs of pivotally connected jaws carried by the annulus for engaging and removing glass blown articles from the support, and means on the pedestal and controlling the jaws for the automatic working thereof.

3. The combination with a glass blowing machine having a movable glass blown article support, of an automatic taking off device comprising a pedestal arranged at one side of the support, a stationary bed on the pedestal, a turn-table movable upon the bed, an annulus vertically adjustable on the turn-table, a plurality of pairs of pivotally connected jaws carried by the annulus for engaging and removing glass blown articles from the support, means on the pedestal and controlling the jaws for the automatic working thereof, and means for adjusting the jaws upon the annulus.

4. The combination with a glass blowing machine having a movable glass blown article support, of an automatic taking off device comprising a pedestal arranged at one side of the support, a stationary bed on the pedestal, a turn-table movable upon the bed, an annulus vertically adjustable on the turn-table, a plurality of pairs of pivotally connected jaws carried by the annulus for engaging and removing glass blown articles from the support, means on the pedestal and controlling the jaws for the automatic working thereof, means for adjusting the jaws upon the annulus, and a connection between the movable support and the turn-table for the simultaneous operation thereof.

5. The combination with a glass blowing machine having a movable glass blown article support, of an automatic taking off device comprising a pedestal, a turn table rotatably supported thereon, an annulus vertically adjustable on the turn table, a pair of crossed and pivotally connected levers having jaws for engaging and removing glass blown articles from the support, means on the pedestal and controlling one lever for the automatic working thereof, and a slot-and-screw connection for adjusting the other lever radially upon the annulus.

6. The combination with a glass blowing machine having a rotary glass blown article support, of an automatic taking off device comprising a turn table, an annulus on the turn table, a plurality of pairs of pivotally connected jaws carried by the annulus for engaging and removing glass blown articles from the support, a fixed cam coacting with the jaws for the automatic opening thereof, yielding means for closing the jaws upon the blown articles, and a connection between the support and the turn table for the simultaneous operation thereof.

In testimony whereof I affix my signature, in the presence of two witnesses.

HENRY C. FENTRESS.

Witnesses:
RUFUS BASHAM,
LEE WILLIAMSON.